United States Patent [19]

Carson et al.

[11] Patent Number: 5,283,904
[45] Date of Patent: Feb. 1, 1994

[54] MULTI-PROCESSOR PROGRAMMABLE INTERRUPT CONTROLLER SYSTEM

[75] Inventors: David G. Carson; Herman D. D'Hooge, both of Hillsboro; Kevin C. Kahn, Portland, all of Oreg.

[73] Assignee: Intel Corporation, Santa Clara, Calif.

[21] Appl. No.: 8,074

[22] Filed: Jan. 22, 1993

Related U.S. Application Data

[63] Continuation of Ser. No. 632,149, Dec. 21, 1990, abandoned.

[51] Int. Cl.⁵ .................................................. G06F 13/26
[52] U.S. Cl. .................................... 395/725; 395/325; 364/241.2; 364/230.2; 364/280.8; 364/240; 364/240.2; 364/DIG. 1
[58] Field of Search ................. 395/725, 325, 275; 340/825.51, 825.5; 370/85.6

[56] References Cited

U.S. PATENT DOCUMENTS

| | | | |
|---|---|---|---|
| 4,268,904 | 5/1981 | Suzuki et al. | 364/200 |
| 4,271,468 | 6/1981 | Christensen et al. | 364/200 |
| 4,394,730 | 7/1983 | Suzuki et al. | 364/200 |
| 4,435,780 | 3/1984 | Herrington et al. | 364/900 |
| 4,621,342 | 11/1986 | Capizzi et al. | 364/900 |
| 4,654,820 | 3/1987 | Brahm et al. | 364/900 |
| 4,796,176 | 1/1989 | D'Amico et al. | 364/200 |
| 4,868,742 | 9/1989 | Gant et al. | 364/200 |
| 4,920,486 | 4/1990 | Nielsen | 364/200 |
| 4,953,072 | 8/1990 | Williams | 364/200 |
| 4,980,854 | 12/1990 | Donaldson et al. | 364/900 |
| 5,060,139 | 10/1991 | Theus | 364/200 |
| 5,099,414 | 3/1992 | Cole et al. | 395/200 |
| 5,125,093 | 6/1992 | McFarland | 395/725 |
| 5,179,707 | 1/1993 | Piepho | 395/725 |

*Primary Examiner*—Gopal C. Ray
*Attorney, Agent, or Firm*—Blakely, Sokoloff, Taylor & Zafman

[57] ABSTRACT

A multi-processor programmable interrupt controller system which includes: an I/O interrupt controller for receiving interrupt requests from an I/O subsystem; multiple processor interrupt controllers, each associated with a specific processor for dispensing of accepted interrupts; and an interrupt controller bus primarily for the transmission of interrupt requests between interrupt controller units and for priority arbitration, using a standard message format and arbitration protocol.

18 Claims, 10 Drawing Sheets

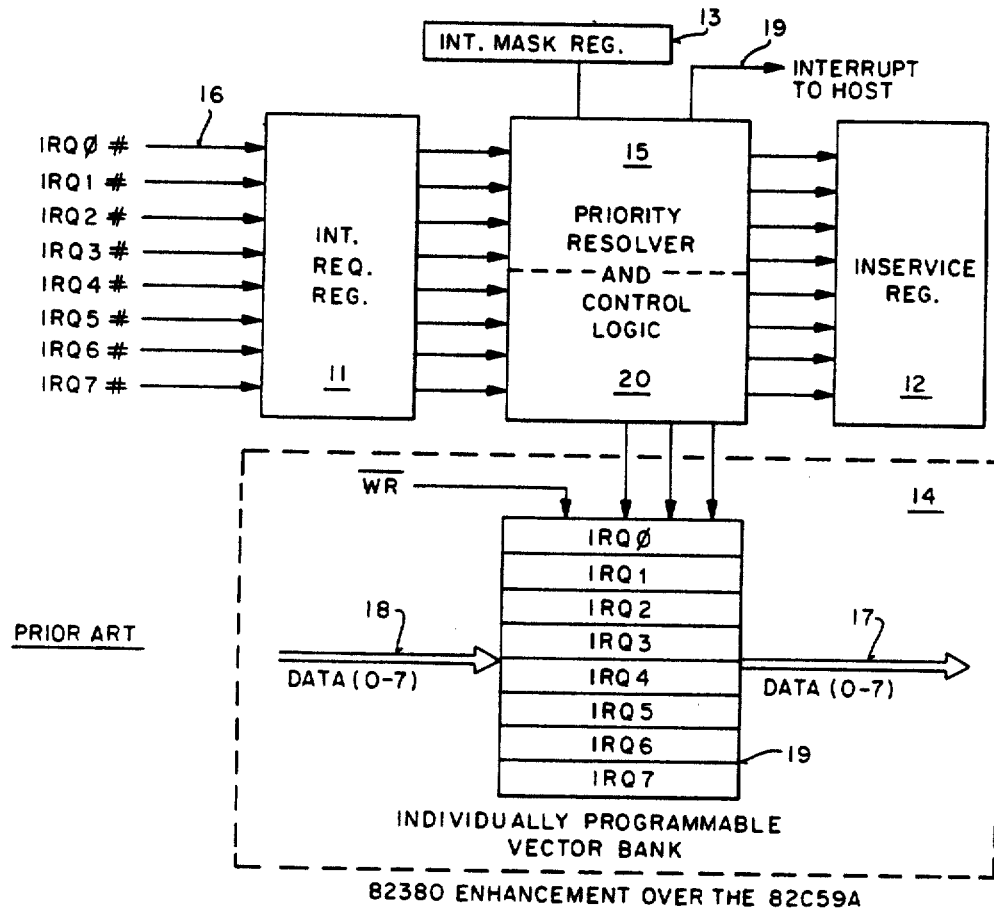
FIG_1
PRIOR ART
82380 ENHANCEMENT OVER THE 82C59A
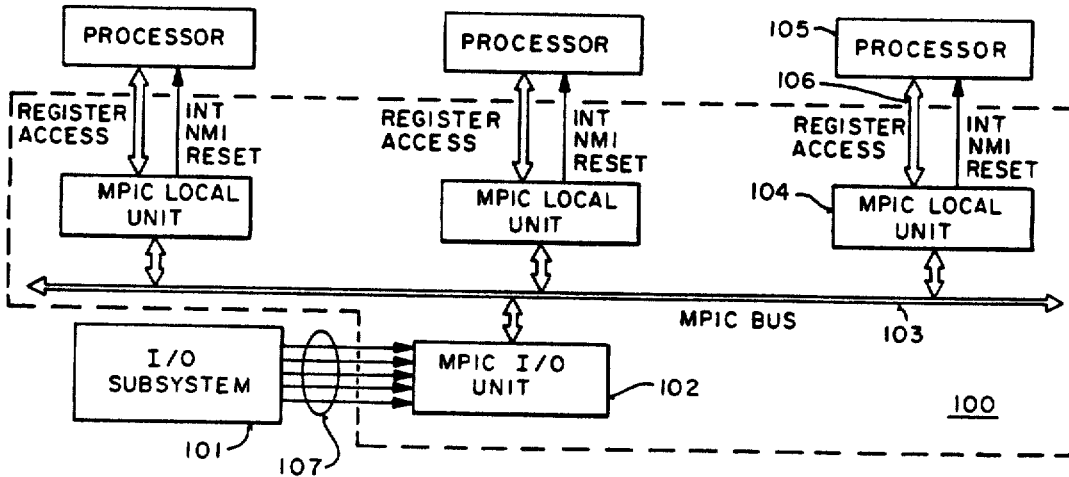
FIG_2

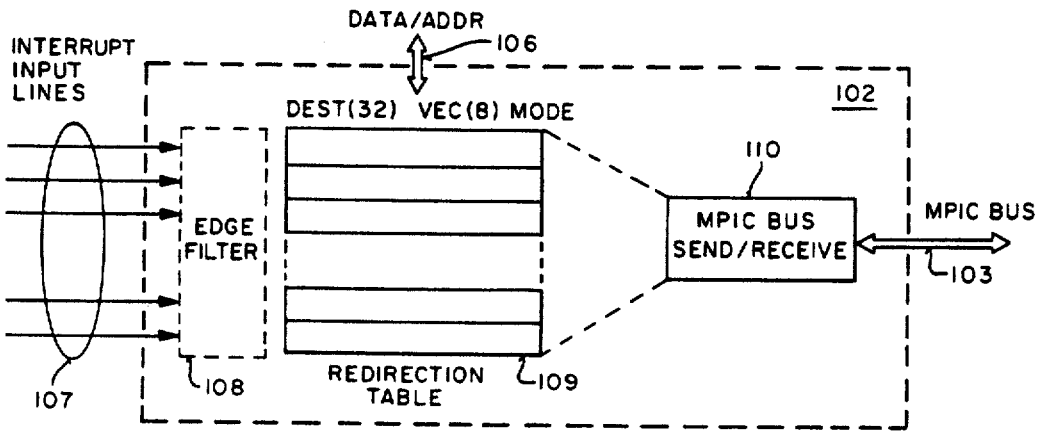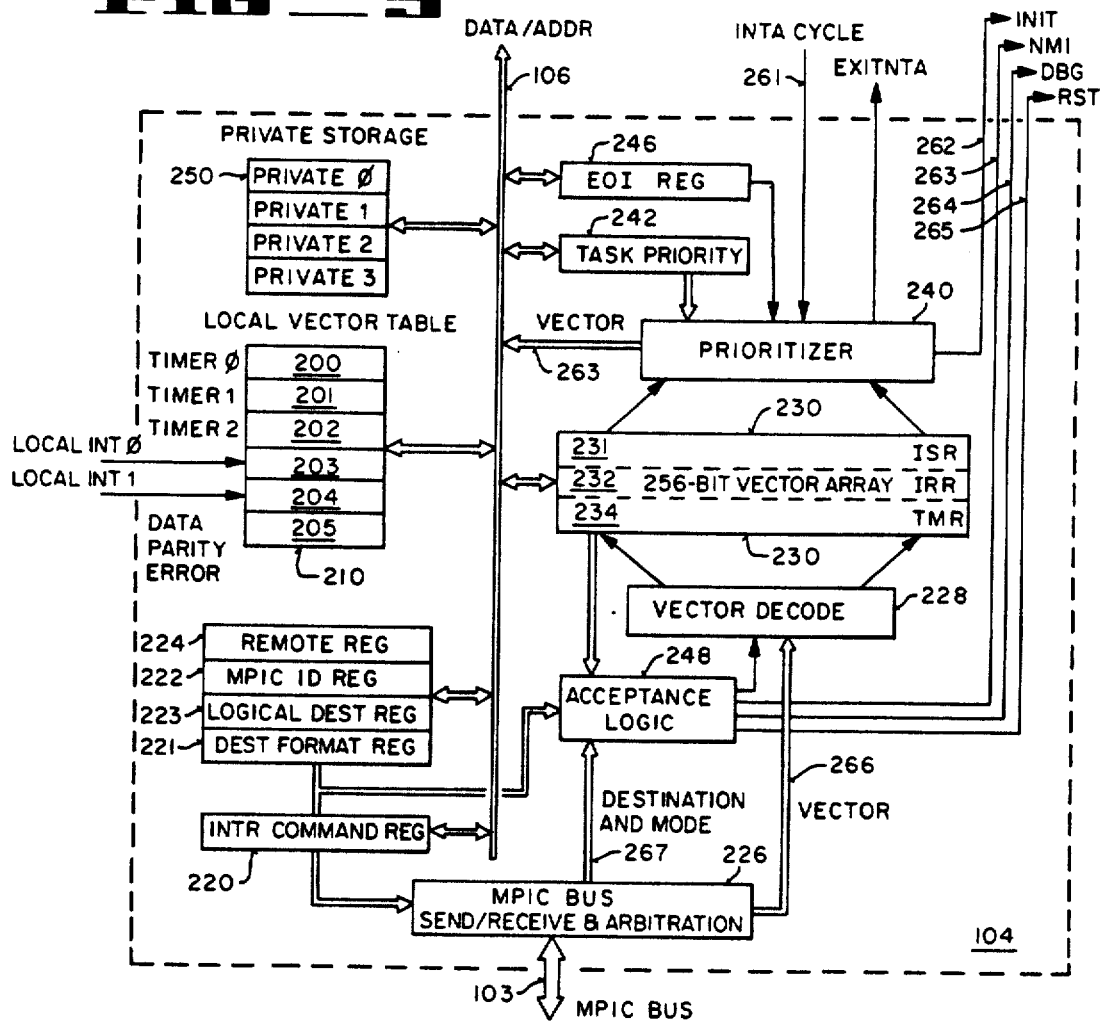

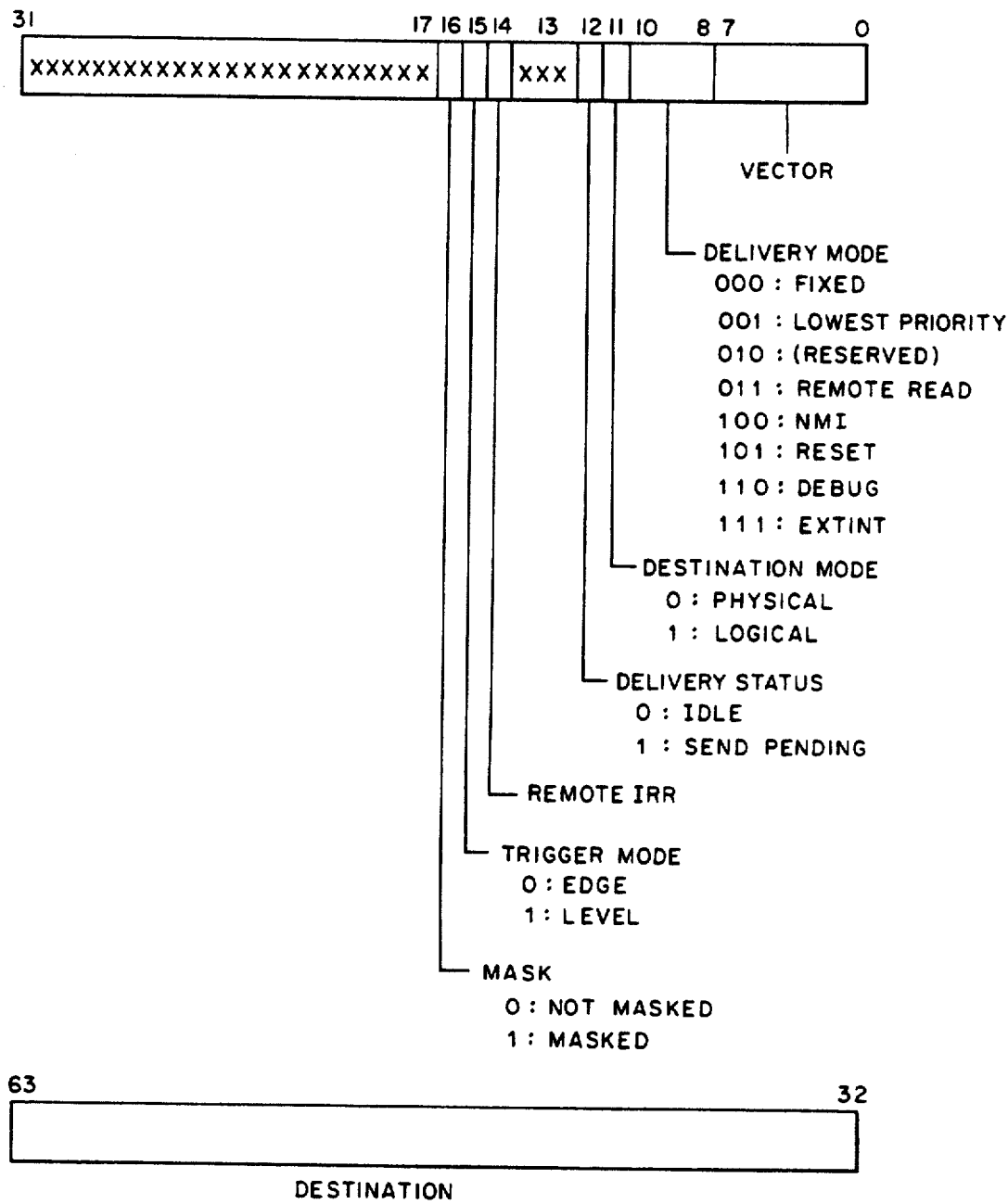
FIG_4

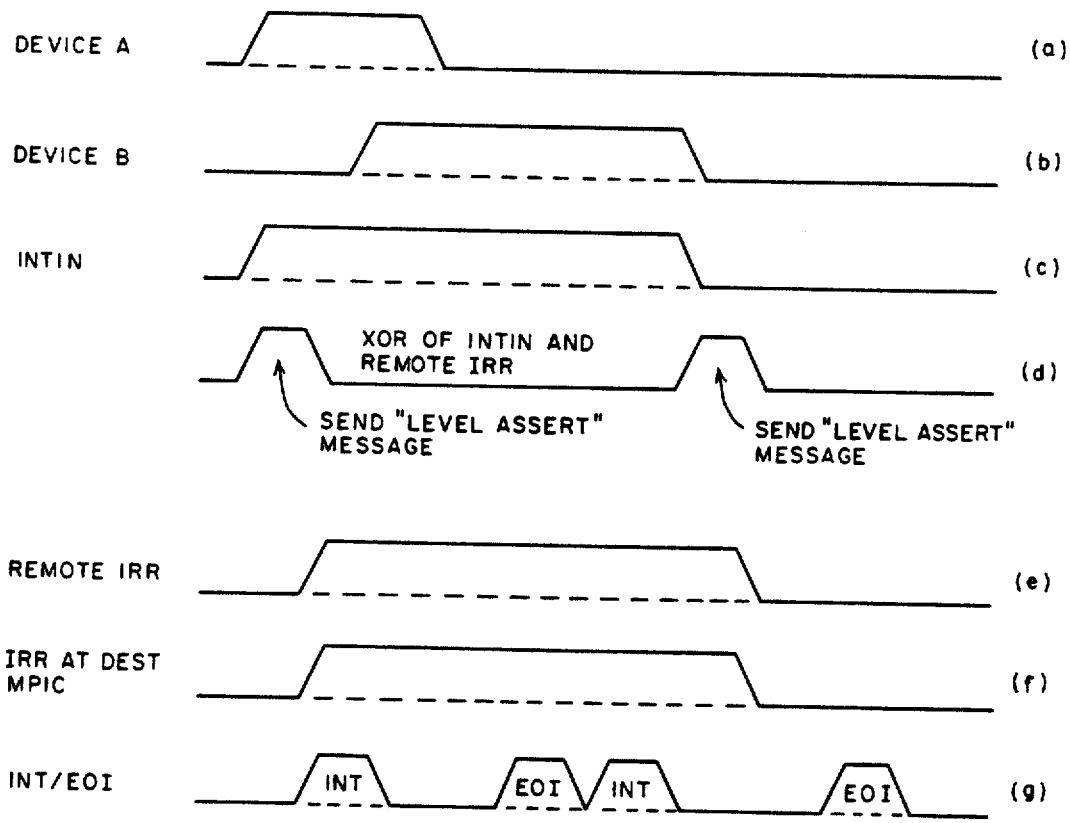

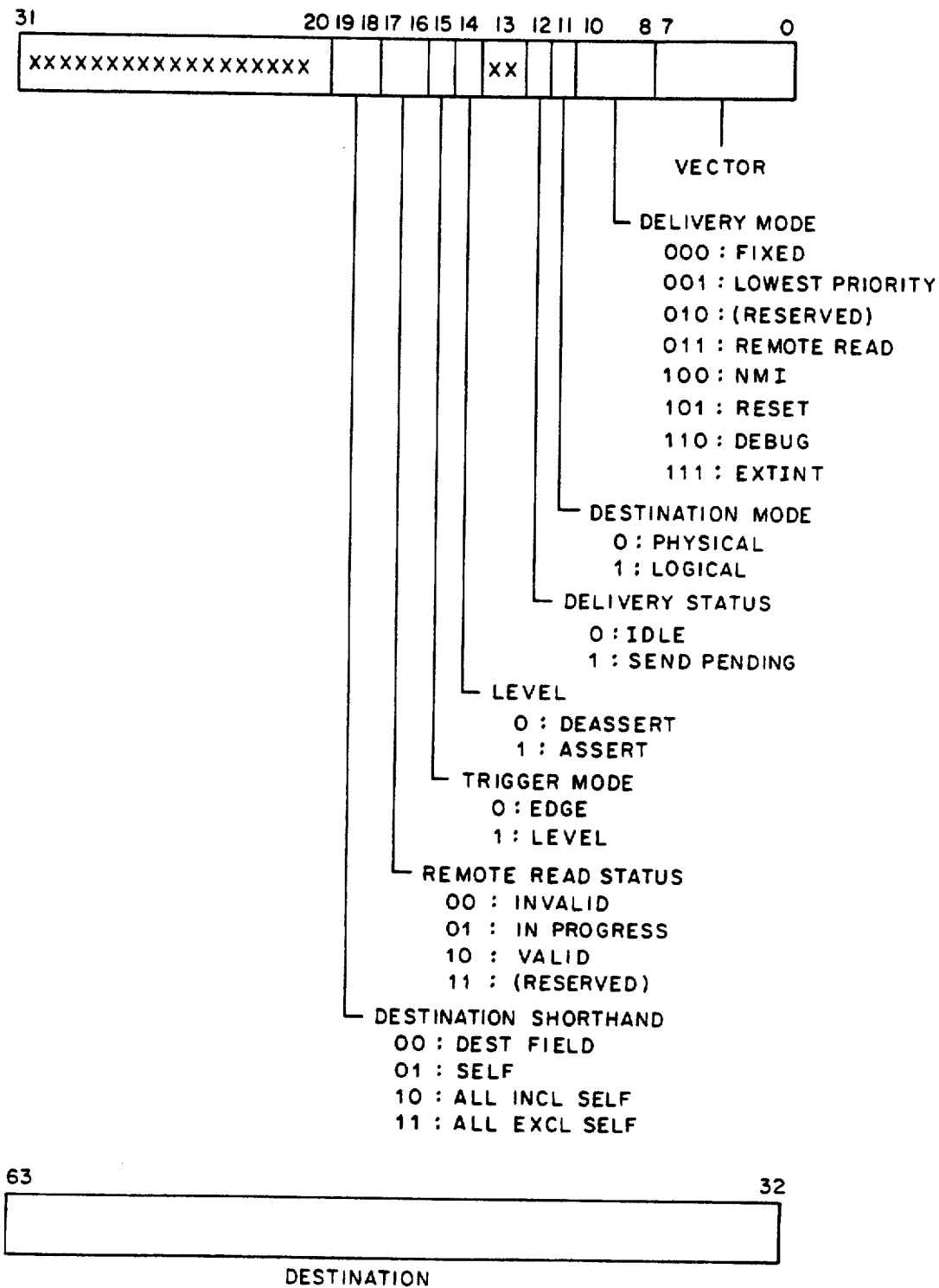
FIG_7

FIG_9
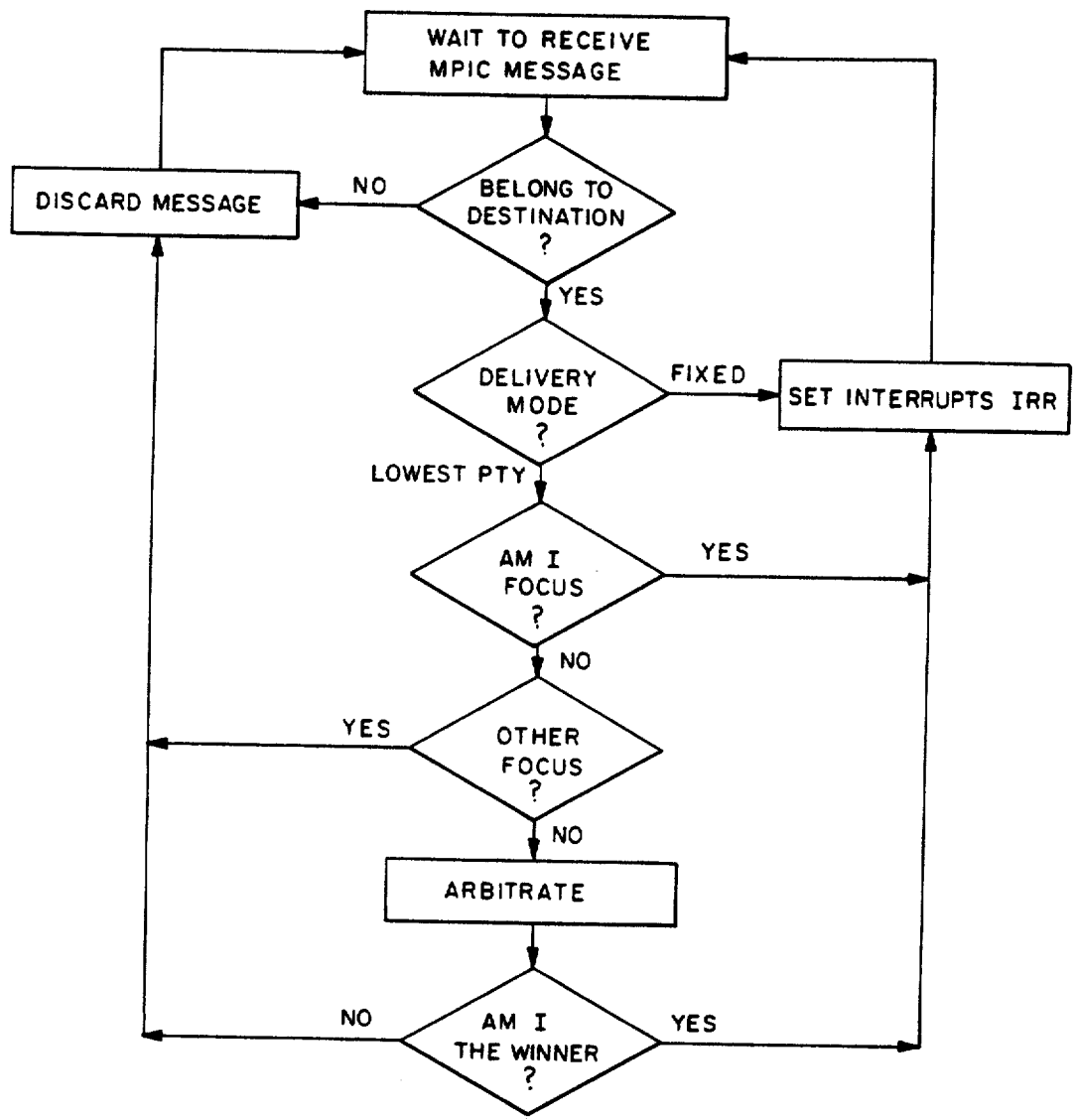
FIG_10
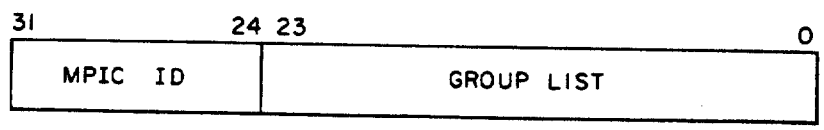

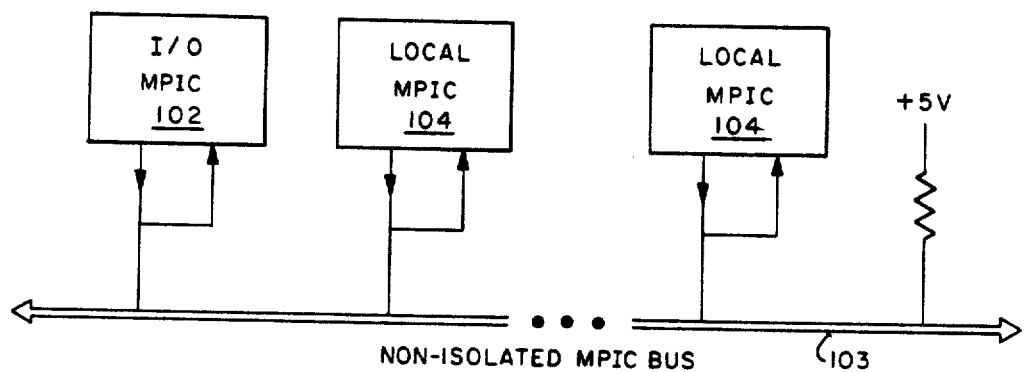
FIG_11
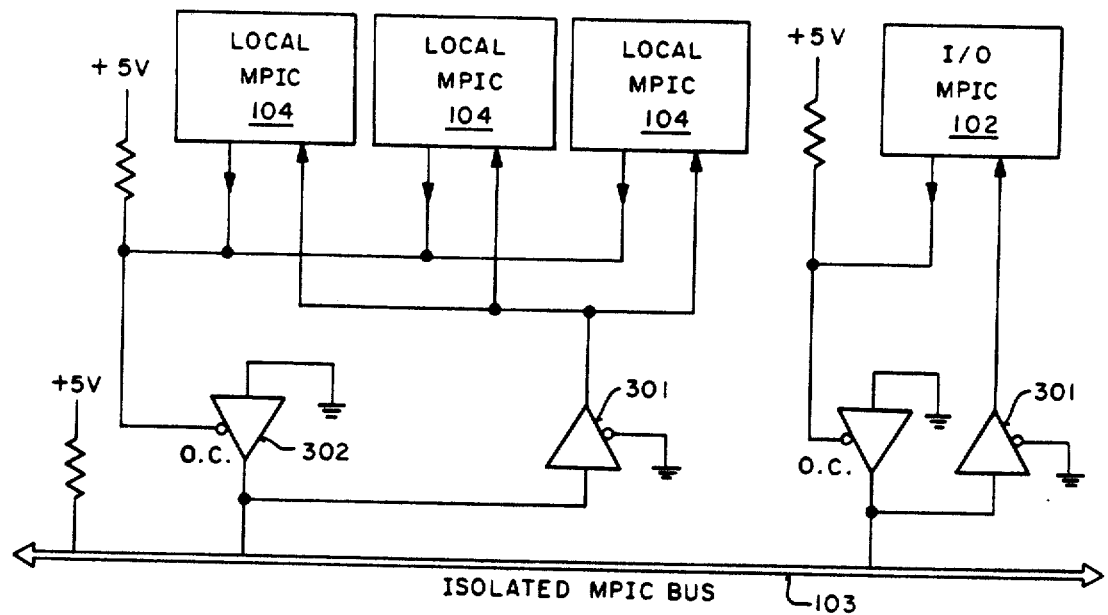
FIG_12

FIG_13

| ID TUPLE (I[i+1] I[i]) | | | MPIC BUS B3 | B2 | B1 | B0 |
|---|---|---|---|---|---|---|
| 0 | 0 | → | 0 | 0 | 0 | 1 |
| 0 | 1 | → | 0 | 0 | 1 | 0 |
| 1 | 0 | → | 0 | 1 | 0 | 0 |
| 1 | 1 | → | 1 | 0 | 0 | 0 |

FIG_14

| | | | | | |
|---|---|---|---|---|---|
| 1: | i76 | i76 | i76 | i76 | MPIC BUS ARBITRATION |
| 2: | i54 | i54 | i54 | i54 | |
| 3: | i32 | i32 | i32 | i32 | |
| 4: | i10 | i10 | i10 | i10 | |
| 5: | DM | M2 | M1 | M0 | DESTINATION MODE AND DELIVERY MODE |
| 6: | "0" | "0" | L | TM | CONTROL BITS |
| 7: | V7 | V6 | V5 | V4 | VECTOR |
| 8: | V3 | V2 | V1 | V0 | |
| 9: | D31 | D30 | D29 | D28 | DESTINATION |
| 10: | D27 | D26 | D25 | D24 | |
| 11: | D23 | D22 | D21 | D20 | |
| 12: | D19 | D18 | D17 | D16 | |
| 13: | D15 | D14 | D13 | D12 | |
| 14: | D11 | D10 | D09 | D08 | |
| 15: | D07 | D06 | D05 | D04 | |
| 16: | D03 | D02 | D01 | D00 | |
| 17: | C | C | C | C | CHECKSUM FOR CYCLES 5 THROUGH 16 |
| 18: | "1" | "1" | "1" | "1" | POSTAMBLE |
| 19: | A | A | A | A | ACCEPT (1000 IF OK, 1110 IF PREEMPT, ELSE ERROR) |
| 20: | "0" | "0" | "0" | "0" | IDLE 1 |
| 21: | "0" | "0" | "0" | "0" | IDLE 2 |

FIG_15

| M2 | M1 | M0 | DELIVERY MODE |
|---|---|---|---|
| 0 | 0 | 0 | FIXED |
| 0 | 0 | 1 | LOWEST PRIORITY |
| 0 | 1 | 0 | (RESERVED) |
| 0 | 1 | 1 | REMOTE READ |
| 1 | 0 | 0 | NMI |
| 1 | 0 | 1 | RESET |
| 1 | 1 | 0 | DEBUG |
| 1 | 1 | 1 | ExtINT |

FIG_16

6: "0" "0" L TM   CONTROL BITS
         │  └── TRIGGER MODE    (0 = EDGE,    1 = LEVEL)
         └───── LEVEL           (0 = DEASSERT, 1 = ASSERT)

FIG_17

TM/L (AAAA)

| DELIVERY MODE | | EDGE | LEVEL-ASSERT | LEVEL-DEASSERT |
|---|---|---|---|---|
| | FIXED | SHORT | SHORT | SHORT |
| | LOWEST PRIORITY | SHORT(1110) | SHORT(1110) | SHORT |
| | | LONG (1000) | LONG (1000) | SHORT |
| | REMOTE READ | LONG | LONG | SHORT |
| | NMI | SHORT | SHORT | SHORT |
| | RESET | SHORT | SHORT | SHORT |
| | DEBUG | SHORT | SHORT | SHORT |
| | ExtINT | SHORT | SHORT | SHORT |

FIG_18

```
 1:  i76   i76   i76   i76    MPIC BUS ARBITRATION
 2:  i54   i54   i54   i54
 3:  i32   i32   i32   i32
 4:  i10   i10   i10   i10
 5:  DM    M2    M1    M0     DELIVERY MODE
 6:  "0"   "0"   L     TM     CONTROL BITS
 7:  V7    V6    V5    V4     VECTOR
 8:  V3    V2    V1    V0
 9:  D31   D30   D29   D28    DESTINATION
10:  D27   D26   D25   D24
11:  D23   D22   D21   D20
12:  D19   D18   D17   D16
13:  D15   D14   D13   D12
14:  D11   D10   D09   D08
15:  D07   D06   D05   D04
16:  D03   D02   D01   D00
17:  C     C     C     C      CHECKSUM FOR CYCLES 5 THROUGH 16
18:  "1"   "1"   "1"   "1"    POSTAMBLE
19:  A     A     A     A      ACCEPT (1000 IF OK, 1110 IF PREEMPT, ELSE ERROR)

20:  p76   p76   p76   p76    LOWEST PRIORITY ARBITRATION OR
21:  p54   p54   p54   p54          32 BITS OF REMOTE REGISTER
22:  p32   p32   p32   p32
23:  p10   p10   p10   p10
24:  o76   o76   o76   o76
25:  o54   o54   o54   o54
26:  o32   o32   o32   o32
27:  o10   o10   o10   o10
28:  A     A     A     A      ACCEPT
29:  "0"   "0"   "0"   "0"    IDLE 1
30:  "0"   "0"   "0"   "0"    IDLE 2
```

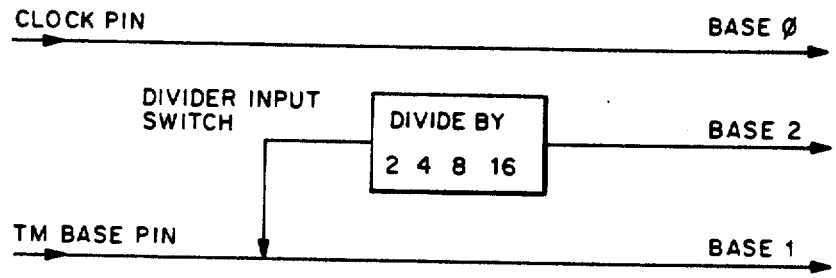
FIG_19
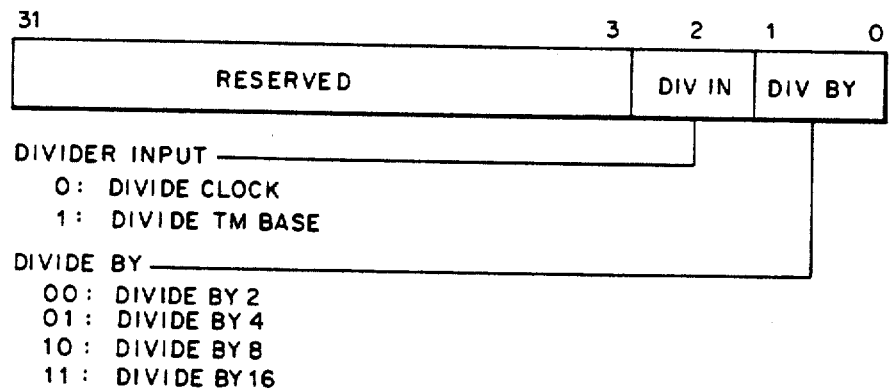
FIG_20
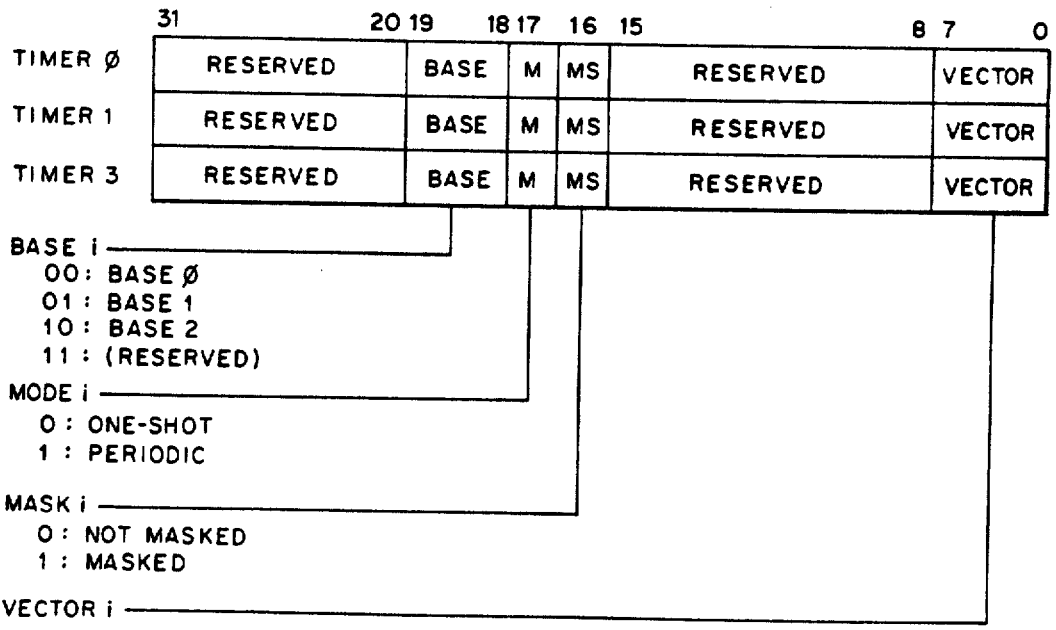
FIG_21

MULTI-PROCESSOR PROGRAMMABLE INTERRUPT CONTROLLER SYSTEM

This is a continuation of application Ser. No. 07/632,149, filed Dec. 21, 1990 now abandoned.

FIELD OF THE INVENTION

The present invention generally relates to the field of multi-processor systems and more specifically to interrupt controllers designed to manage peripheral equipment service interrupt requests in a multi-processor environment.

BACKGROUND OF THE INVENTION

Input/output peripheral equipment, including such computer items as printers, scanners and display devices require intermittent servicing by a host processor in order to ensure proper functioning. Services, for example, may include data delivery, data capture and/or control signals. Each peripheral will typically have a different servicing schedule that is not only dependent on the type of device but also on its programmed usage. The host processor is required to multiplex its servicing activity amongst these devices in accordance with their individual needs while running one or more background programs. Two methods for advising the host of a service need have been used: polled device and device interrupt methods. In the former method, each peripheral device is periodically checked to see if a flag has been set indicating a service request, while, in the latter method, the device service request is routed to an interrupt controller that can interrupt the host, forcing a branch from its current program to a special interrupt service routine. The interrupt method is advantageous because the host does not have to devote unnecessary clock cycles for polling. It is this latter method that the present invention addresses. The specific problem addressed by the current invention is the management of interrupts in a multi-processor system environment.

Multi-processor systems, often a set of networked computers having common peripheral devices, create a challenge in the design of interrupt control methods. For instance, in the case of a computer network servicing a number of users, it would be highly desirable to distribute the interrupt handling load in some optimum fashion. Processors that are processing high priority jobs should be relieved of this obligation when processors with lower priority jobs are available. Processors operating at the lowest priority should be uniformly burdened by the interrupt servicing requests. Also, special circumstances may require that a particular I/O device be serviced exclusively by a preselected (or focus) processor. Thus, the current invention addresses the problem of optimum dynamic and static interrupt servicing in multi-processor systems.

Prior art, exemplified by Intel's 82C59A and 82380 programmable interrupt controllers (PICs), are designed to accept a number of external interrupt request inputs. The essential structure of such controllers, shown in FIG. 1, consists of six major blocks:

| | |
|---|---|
| IRR - | Interrupt Request Register 11 stores all interrupt levels (IRQx) on lines 16 requesting service; |
| ISR - | Interrupt Service Register 12 stores all interrupt levels which are being serviced, status being updated upon receipt of an end-of-interrupt (EOI); |
| IMR - | Interrupt Mask Register 13 stores the bits indicating which IRQ lines 16 are to be masked or disabled by operating on IRR11; |
| VR - | Vector Registers 19, a set of registers, one for each IRQ line 16, stores the pre-programmed interrupt vector number supplied to the host processor on data bus 17, containing all the necessary information for the host to service the request; |
| PR - | Priority Resolver 15, a logic block that determines the priority of the bits set in IRR11, the highest priority is selected and strobed into the corresponding bit of ISR12 during an interrupt acknowledge cycle (INTA) from the host processor; |
| Control Logic - | Coordinates the overall operations of the other internal blocks within the same PIC, activates the host input interrupt (INT) line 19 when one or more bits of IRR11 are active, enables VR19 to drive the interrupt vector onto data bus 17 during an INTA cycle, and inhibits all interrupts with priority equal or lower than that being currently serviced. |

Several different methods have been used to assign priority to the various IRQ lines 16, including:
1) fully nested mode,
2) automatic rotation—equal priority devices, made and
3) specific rotation—specific priority mode.

The fully nested mode, supports a multi-level interrupt structure in which all of the IRQ input lines 16 are arranged from highest to lowest priority: typically IRQ0 is assigned the highest priority, while IRQ7 is the lowest.

Automatic rotation of priorities when the interrupting devices are of equal priority is accomplished by rotating (circular shifting) the assigned priorities so that the most recently served IRQ line is assigned the lowest priority. In this way, accessibility to interrupt service tends to be statistically levelled for each of the competing devices.

The specific rotation method gives the user versatility by allowing the user to select which IRQ line is to receive the lowest priority, all other IRQ lines are then assigned sequentially (circularly) higher priorities.

From the foregoing description it may be seen that PIC structures of the type described accommodate uni-processor systems with multiple peripheral devices but do not accommodate multi-processor systems with multiple shared peripheral devices to which the present invention is addressed.

SUMMARY OF THE INVENTION

It is the object of the current invention to provide a multi-processor programmable interrupt controller (MPIC) system including but not limited to the following capabilities:
1) multiple I/O peripheral devices, each with its own set of interrupt;
2) static as well as dynamic multi-processor interrupt management including the symmetrical distribution of interrupts over selected processors;
3) level or edge triggered interrupt request pins, software selectable per pin;

4) per pin programmable interrupt vector and steering information;
5) programmable vector address field defined by each operating system;
6) inter-processor interrupts allowing any processor to interrupt any other for dynamic reallocation of interrupt tasks; and
7) support of system wide support functions related to non-maskable interrupts (NMI), processor reset, and system debugging.

The present invention achieves these capabilities by means of an MPIC system structure which includes three major subsystems:

1) an I/O MPIC unit for acquiring interrupt request (IRQ) signals from its associated I/O peripheral devices, having a redirection table for processor selection and vector/priority information;
2) local-MPIC units, each managing interrupt requests for a specific system processor including pending, nesting and masking operations, as well as inter-processor interrupt generation; and
3) a MPIC-bus for communications between the I/O and local MPIC units as well as between local-MPIC units.

It is a further object of this invention to support system scaling granularity of one, i.e., one processor at a time without significant penalty for any number of processors.

BRIEF DESCRIPTION OF THE DRAWINGS

The present invention may be understood more fully from the detailed description given below and from the accompanying drawings of the preferred embodiments of the invention, which, however should not be taken to limit the invention to the specific embodiment but are for explanation and understanding only.

FIG. 1 depicts a block diagram of a common prior art uni-processor programmable interrupt controller (PIC).

FIG. 2 is a block diagram of the currently preferred multi-processor programmable interrupt controller (MPIC) system.

FIG. 3 is a block diagram of the currently preferred I/O-MPIC unit.

FIG. 4 shows the various fields that make-up a Redirection Table 64-bit entry.

FIG. 5 is a block diagram of the currently preferred local-MPIC unit.

FIG. 6 shows the various fields that constitute the local vector table entries of a local-MPIC unit.

FIG. 7 shows the various field assignments of the interrupt Command Register.

FIG. 8 depicts the tracking of the remote IRR bit by the destination IRR bit.

FIG. 9 is a flow chart depicting the interrupt acceptance process by a local-MPIC unit.

FIG. 10 shows the MPIC-ID register configuration.

FIG. 11 shows the non-isolated MPIC-Bus connections.

FIG. 12 shows a tri-state buffered MPIC-Bus arrangement.

FIG. 13 shows the 2-bit decode process for the MPIC-ID used in bus arbitration.

FIG. 14 shows the MPIC short message forms.

FIG. 15 shows the MPIC message encode of the delivery mode.

FIG. 16 defines the control bits of the MPIC message.

FIG. 17 defines the extended delivery mode control bit coding.

FIG. 18 shows the MPIC-Bus medium and long message formats.

FIG. 19 shows the Base 0, 1, and 2 time generator.

FIG. 20 shows the Divide (Base 2) Configuration Register bit assignments.

FIG. 21 shows the contents of the three timer Local Vector Table.

DESCRIPTION OF THE PREFERRED EMBODIMENT(S)

A multi-processor programmable interrupt controller (MPIC), system is described. In the following description, numerous specific details are set forth, such as a specific number of input pins, bits, devices, etc., in order to provide a thorough understanding of the preferred embodiment of the present invention. It will be obvious, however, to one skilled in the art that the present invention may be practiced without these specific details. In other instances, well-known circuits have not been shown in detail, or have been shown in block diagram form only, in order to avoid unnecessarily obscuring the present invention.

Additionally, in describing the present invention, reference is made to signal names peculiar to the currently preferred embodiment. Reference to these specific names should not be construed as a limitation on the spirit or scope of the present invention.

A. Overview of the MPIC Architecture

The multi-processor programmable interrupt controller (MPIC) system is designed to accommodate interrupt servicing in a multi-processor environment. Current practice is mainly concerned with uni-processor systems in which the interrupts of a number of peripheral units are serviced by a single processor aided by a programmable interrupt controller (PIC). In a multi-processor system, it is often desirable to share the burden of interrupt servicing among a group of similar processors. This implies the ability to broadcast interrupt service requests to the pertinent group of processors and a mechanism for determining the equitable assignment of the tasks amongst the processors. The uni-processor design problem is significantly simpler: the PIC dedicated to the processor assigns a priority to each interrupt request (IRQ) line, orders the requests according to the assigned priorities and delivers the necessary information to the processor to timely initiate the appropriate servicing subroutine.

The MPIC system provides both static and dynamic interrupt task assignment to the various processors. When operating in a purely static mode, it functions much as a PIC in a uni-processor system assigning each interrupt according to a prescribed schedule.

When operating in a dynamic mode, the MPIC manages interrupt task assignment by taking into consideration the relative task priority between processors.

It is expected that more typical usage would entail elements of both static and dynamic interrupt management. Static assignments might be made, for example, when licensing considerations preclude the shared use of servicing software. Under other circumstances it may be desirable to restrict the interrupt servicing task to a subset of processors that share a common peripheral subsystem. In the extreme case, all processors are subject to interrupt requests from all peripheral subsystems.

FIG. 2 is a block diagram of the currently preferred multi-processor programmable interrupt controller (MPIC) system. The MPIC 100 consists of three major units: I/O-MPIC unit 102, MPIC-bus 103, and multiple local-MPIC units of which one is labelled 104. Each I/O-MPIC 102 accepts interrupt lines 107 from its associated I/O subsystem 101 (typically a collection of peripherals), each line corresponding to a unique IRQ. The I/O-MPIC output is coupled to MPIC bus 103 which broadcasts to all local-MPIC units 104 appropriately formatted IRQ messages containing all necessary identifying and priority information. Each local MPIC unit 104 examines the message and decides whether to accept it. If tentatively accepted by more than one local MPIC unit 104, an arbitration procedure is invoked between competing units. The local MPIC unit 104 with the lowest priority wins the arbitration and accepts the IRQ and timely dispenses it to its associated processor 105.

B. Interrupt Control

The interrupt control functions of both I/O and local MPIC units are collectively responsible for delivering interrupts from interrupt sources to an interrupt servicing processor in a multi-processor system.

Each interrupt has an identity, the interrupt vector, that uniquely distinguishes the interrupt from other interrupts in the system. When a processor accepts an interrupt (IRQ), it uses the vector to locate the entry point of the appropriate software interrupt handler in its interrupt table. The preferred embodiment supports 256 (8-bit) distinct vectors in the range of 0 to 255.

Each interrupt has an interrupt priority represented by the five most significant bits of the 8-bit interrupt vector, i.e., 16 priority levels with 0 being lowest and 15 being the highest priority. This implies that 16 different vectors may share a single interrupt priority level.

Interrupts are generated by a number of different sources, which may include:

1) external I/O devices connected to the I/O-MPIC unit manifested by either edges (level transitions) or levels on interrupt input pins and may be redirected to any processor;
2) locally connected device interrupts, always directed to the local processor only, manifested as an edge or level signal;
3) MPIC timer interrupts, generated within the local-MPIC unit by any of the three programmable timers;
4) inter-processor interrupts addressed to any individual processor of groups of processors in support of software self interrupts, pre-emptive scheduling, cache memory table look-aside buffer (TLB) flushing, and interrupt forwarding; and
5) bus parity error interrupt generated by any local MPIC unit that detects a parity error on the data bus causing its host to be interrupted.

The destination of an interrupt can be zero, one, or a group of processors in the system. A different destination can be specified for each interrupt. The sender specifies destination of an interrupt in one of two destination modes: physical mode and logical mode.

In physical mode the destination processor is specified by a unique 8-bit MPIC-ID. Only a single destination or a broadcast to all (MPIC-ID of all ones) can be specified in physical destination mode.

Each MPIC unit has a register that contains the unit's 8-bit MPIC-ID. The MPIC-ID serves as a physical name of the MPIC unit. It can be used in specifying destination information and is also used for accessing the MPIC-bus. The mechanism by which an MPIC establishes its MPIC-ID is implementation dependent.

Some implementations may latch in the MPIC-ID on some of their pins from slot number at reset time. The MPIC-ID is read-write by software.

The MPIC-ID serves as the physical "name" of the MPIC unit used for addressing the MPIC in physical destination mode and for MPIC-bus usage.

In logical mode, destinations are specified using a 32-bit destination field. All local MPIC units contain a 32-bit Logical Destination register 223 against which the destination field of the interrupt is matched to determine if the receiver is being targeted by the interrupt. An additional 32-bit Destination Format register 221 in each local-MPIC unit defines exactly how the destination field is to be compared against the destination format register. In other words, the Destination Format register 221 defines the interpretation of the logical destination information.

The Destination Format register 221 partitions the 32-bit destination information into two fields:

(1) an encoded field that can be used to represent some scalar ID. Matching on the encoded field requires an exact match on the value of this field. To support broadcast to all in logical mode, an encoded field value of all ones is treated special in that it matches any encoded value.
(2) a decoded field (or bit array) that can be used to represent a set of elements. Matching on the decoded field requires that at least one of the corresponding pair of bits in the decoded fields are both ones.

The Destination Format register 221 is controlled by software and determines which bits in the destination information are part of the encoded field and which bits are part of the decoded field. To have a match on the destination, both fields must match.

The logical-level interpretation of what each field really represents is totally defined by the operating system. Note that these fields need not use consecutive bits and that the length of either field can be zero. A zero-length field always matches. Since destination interpretation is done locally by each local-MPIC unit, the Destination Format registers of all local MPIC units in a system must be set up identically.

Three example usage models using different interpretations are described next to further illustrate the destination specification mechanism. These are probably the most common models used in practice.

Example 1: Single-Level Model

In this model, all 32 bits of destination information are interpreted as decoded field. Each bit position corresponds to an individual Local MPIC unit. Bit position could correspond to physical MPIC-ID, but this need not be the case. This scheme allows the specification of arbitrary groups of MPIC units simply by setting the member's bits to one, but allows a maximum of 32 processors (or local-MPIC units) per system. In this scheme, a MPIC unit is addressed if its bit is set in the destination array. Broadcast to all is achieved by setting all 32 destination bits to one. This selects all MPIC units in the system.

Example 2: Hierarchical Model

This model uses encoded and decoded fields of non-zero lengths. The encoded field represents a static cluster of local MPIC units, while a bit position in the decoded field identifies an individual local MPIC unit within the cluster. Arbitrary sets of processors within a cluster can be specified by naming the cluster and setting the bits in the decoded field for the selected members in the cluster. This supports systems with more than 32 processors, and matches a DASH-style cluster architecture. Broadcast to all is achieved by setting all 32 destination bits to one. This guarantees a match on all clusters, and will select all MPICs in each cluster.

Example 3: Bimodal Model

Each value of the encoded field is the ID of an individual local-MPIC. This ID could be identical to the MPIC's physical MPIC-ID, but this need not be the case. Each bit in the decoded field represents a predefined group. This scheme allows addressing a single MPIC unit by using its ID in the encoded field (and selecting no groups), or to address a group (or union of groups) of MPICs by setting the encoded field to all ones and selecting the groups in the decoded field. Each MPIC unit could be a member of multiple groups. Supporting broadcast to all in the bimodal model requires that software define a group that contains all local-MPICs in the system. Broadcast is then achieved by setting all 32 destination bits to one. This matches all individual IDs and also matches on the group that contains all local units.

Each processor has a processor priority that indicates the relative importance of the task or code that the processor is currently executing. This code may be part of a process or thread, or it may be an interrupt handler. The priority is dynamically raised or lowered with changing tasks thus masking out lower priority interrupts. Upon servicing of an IRQ, the processor returns to a previously interrupted activity.

A processor is lowest priority within a given group of processors if its processor priority is the lowest of all processors in the group. Because one or more processors may be simultaneously lowest priority within a given group, availability is subject to the process of arbitration.

A processor is the focus of an interrupt if it is currently servicing that interrupt, or if it currently has a request pending for that interrupt.

An important feature of the current invention is the guarantee of exactly-once delivery semantics of interrupts to the specified destination which implies the following attributes of the interrupt system:

1) interrupt injection is never rejected;
2) interrupts (IRQs) are never lost;
3) in the case of edge triggered interrupts, the same IRQ occurrence is never delivered more than once, i.e., by delivering an interrupt first to its focus processor (if it currently has one), multiple occurrences of the same interrupt while the first is pending (servicing not complete) are all recorded as pending in the local-MPIC interrupt request register's (IRR's) pending bit corresponding to that particular interrupt request;
4) for level activated interrupts, the state of the I/O-MPIC's interrupt pin is re-created at the destination local-MPIC's IRR pending bit whenever its state differs from the state of the I/O-MPIC interrupt input pin, the destination local-MPIC only initiating the same IRQ upon execution of an end-of-interrupt (EOI) signal, unless the processor explicitly raises its task priority.

The preferred embodiment supports two modes for the redirection of these incoming IRQ and for the selection of the destination processor: fixed static mode and dynamic lowest-priority mode. These and other possible operating system supported modes are supported by the following information:

1) MPIC-ID's, known by each MPIC unit,
2) Destination Address field from the I/O-MPIC's re-direction table,
3) the MPIC unit address; each MPIC unit knows its own address,
4) whether an MPIC unit is currently the focus for the interrupt, and
5) priority of all processors.

The fixed mode is the simplest method. The interrupt is unconditionally broadcast by the I/O MPIC to all MPIC's encoded in the destination address field for the particular IRQ, typically a single local MPIC is designated. Priority information is ignored. If the destination processor is not available, the interrupt is held pending at the destination processor's local-MPIC until the processor priority is low enough to have the local-MPIC dispense the interrupt to the processor. Fixed re-direction results in:

1) static distribution across all processors; and
2) assignment of a specific local-MPIC to a given interrupt.

Fixed redirection allows existing single threaded device drivers to function in a multi-processor environment provided that software binds the driver code to run on one processor and the MPIC unit is programmed for fixed delivery mode so that the device's interrupt is directed to the same processor on which the driver runs.

The lowest-priority re-direction mode causes the lowest priority available processor in a group specified by the re-direct address field to service the interrupt. If more than one processor is operating at the lowest-priority, then one of them is picked at random. Because each of these lowest-priority processor's local-MPIC knows their associated processor's priority, an arbitration protocol is exercised on the MPIC-bus to determine the lowest priority. An additional processor selection algorithm is applied to the remaining candidate lowest priority processors for the random selection of a processor with the object of uniformly spreading the interrupt servicing task amongst the lowest priority processors.

C. Structural Description

The I/O-MPIC unit 102 of FIG. 2 is further detailed in FIG. 3. The interrupt input lines 107 provide the means for the I/O devices to inject their interrupts. An edge filter 108 is used to provide clean level transitions at the input pins. The re-direction table 104 has a dedicated 64-bit entry for each interrupt input pin (line) 107. Unlike the prior art IRQ pins of the 82C59A/82380 PIC previously discussed, the notion of interrupt priority is completely unrelated to the position of the physical interrupt input pin on the I/O MPIC unit of the current invention. The priority of each input pin 107 is software programmable by assigning an 8-bit vector in the corresponding entry of the Re-direction Table 104.

FIG. 4 shows the format of each Re-direction Table 64-bit entry. The description of each entry is as follows:

| | |
|---|---|
| Vector (0:7): | An 8-bit field containing the interrupt vector. |
| Delivery Mode (8:10): | A 3-bit field that specifies how the local MPIC's listed in the destination field should act upon receipt of this signal, has following meaning: |
| 000 - | Fixed - deliver to all processors listed on destination. |
| 001 - | Lowest Priority - deliver to lowest priority processor among all processors listed in destination. |
| 011 - | Remote Read - request contents of an |

-continued

| | |
|---|---|
| | MPIC unit register, whose address is in the Vector field, to be stored in the Remote Register for access by the local processor, edge trigger mode. |
| 100 - NMI - | deliver to the non-maskable interrupt (NMI) pin of all listed processors, ignoring vector information, treated as edge sensitive signal. |
| 101 - Reset - | deliver to all processors listed by asserting/de-asserting the processors' reset pin, setting all addressed local |
| 110 - Debug - | deliver to all listed processors by asserting/de-asserting the local MPIC's debug pin; treated as a level sensitive signal. |
| 111 - Ext INT - | deliver to the INT pin of all listed processors as an interrupt originating in an externally connected 8259A compatible interrupt controller, treated as a level sensitive signal. |

(Note that Delivering Modes of Reset, Debug and ExtINT are not I/O device interrupt related. Reset and Debug are interprocessor interrupts while the ExtINT mode is included to provide compatibility with the existing 8259A PIC de facto standard.)

| | |
|---|---|
| Destination Mode (11): | Interprets Destination field:<br>0 - Physical Mode - use MPIC-ID in bits 56:63.<br>1 - Logical Mode - 32 bit field is the logical destination, operating system defined. |
| Delivery Status (12): | A 2-bit software read only field containing current delivery status of the interrupt:<br>0 - Idle - no current activity,<br>1 - Send Pending - interrupt injected to local-MPIC, held up by other injected interrupts,<br>This bit is software read-only, i.e., 32-bit software writes to the re-direction table 109 do not affect this bit. |
| Remote IRR (14): | Mirrors the Interrupt Request Register (IRR) bit of the destination local-MPIC for level sensitive interrupts only, and when status of bit disagrees with the state of the corresponding interrupt input line 107, an I/O-MPIC message is sent to make the destination's IRR bit reflect the new state causing the remote (local-MPIC) IRR bit to track. This bit is software read-only. |
| Trigger Mode (15): | Indicates the format of interrupt signal:<br>0 - edge sensitive<br>1 - level sensitive |
| Mask (16): | Indicates mask status:<br>0 - non masked interrupt (NMI)<br>1 - masked interrupt capable of being blocked by higher priority tasks. |
| Destination (32:63): | 32-bit field representing interrupt destination defined by the operating system. The lower part of FIG. 4 depicts the two possible formats previously discussed: a 32-bit physical (decoded) format using one bit per destination processor and an 8/24 bit logical format with 8 coded bits and 24 decoded bits defining a 256 × 24 two dimensional destination space. |

The 64-bit wide re-direct table 109 is read/write accessible through the 32-bit address and 32 data lines, DATA/ADDR 106, of a host processor, except as noted above for the Delivery Status and Remote IRR bits which are hardware write and software read only.

The re-direction table entries are formatted and broadcast to all local-MPIC units 104 by MPIC-bus send/receive unit 110. The MPIC-bus 107 protocol specifies a 5-wire synchronous bus, 4 wires for data and one wire for its clock. Specific details of message formats will be covered under the section on MPIC-Bus Protocol. Acceptance results in the reset of the Delivery Status to Idle.

The local-MPIC unit 104 is responsible for interrupt acceptance, dispensing of interrupts to the processor and sending inter-processor interrupts.

Depending on the interrupt delivery mode specified in the interrupt's re-directional table entry, zero, one or more MPIC units may accept an interrupt. A local-MPIC accepts an interrupt only if it can deliver the interrupt to its associated processor. Accepting an interrupt is purely an I/O-MPIC 102 and local-MPIC 104 matter while dispensing an interrupt to a processor only involves a local-MPIC 104 and its local processor 105.

The Re-direction Table 109 of the I/O-MPIC unit 102 serves to steer interrupts that originate in the I/O sub-system 101 and may have to be directed to any processor by broadcasting the Re-direction Table entry corresponding to a given interrupt over the MPIC-Bus 103.

FIG. 5 details the structural elements of the local-MPIC unit 104. The local vector table 210 is similar in function to the I/O-MPIC Re-direction Table 109 except that it is restricted to interrupts relating to the associated local processor only. Local Vector Table 201 contains six 32-bit entries. Entries 201 through 202 correspond to timers 0 through 2; entries 203 and 204 correspond to local interrupt input pins; and entry 205 controls interrupt generation for data parity errors. The higher order bits in timer entries 200 through 202 contain timer-specific fields not present in the other entries (as detailed under the later discussion on timers). FIG. 6 defines the various fields associated with local vector table entries 200 through 205.

| | |
|---|---|
| Vector (0:7): | An 8-bit field containing the interrupt Vector. |
| Delivery Mode (DELV) (8:10): | A 3-bit field having the same meaning as in re-direction table 109 except lowest priority (001) is synonymous with fixed (000). |
| Remote IRR (R) (14): | This bit mirrors the interrupt's IRR bit of this local-MPIC unit. It is used solely for level triggered local interrupts, is undefined for edge triggered interrupts, and is software read-only. |
| Trigger Mode (TM) (15): | 0 indicates edge sensitive trigger.<br>1 indicates level sensitive interrupt.<br>Local interrupt pins (203, 204) may be programmed as other edge or level triggered while Timer (200:202) and Parity (205) are always edge sensitive. |
| Mask (MS) (16): | 0 enables interrupt, 1 masks interrupt. |
| Mode (M) (17): | Selects mode of timer; 0 is one shot, 1 is periodic |
| Base (18:19): | Selects one of three time base for counter. |

(Mode and Base parameters will be discussed further in the section on Timer Architecture.)

A processor generates inter-processor interrupts by writing to the 64-bit interrupt Command Register 220, whose layout is similar to that of the I/O-MPIC Redirection Table 109. The programmable format, very similar to an entry in the Re-direction Table 109 is shown in FIG. 7, allows every processor to generate any interrupt thereby allowing a processor to forward an interrupt originally accepted by it to other processors. This feature is also useful for debugging. The Interrupt Command Register 220 is software read-write.

| | |
|---|---|
| Vector (0:7): | Identifies interrupt being sent. |
| Delivery Mode (8:10) | Same interpretation as for Re-direction Table 109. |
| Destination Mode (11): | Same interpretation as for Re-direction Table 109. |
| Delivery Status (12): | Same interpretation as to Re-direction Table 109. Local processor sets status, local-MPIC up-dates. Software may read this field to find out if the interrupt has been sent and, if so, Interrupt Command Register 220 is ready for accepting a new interrupt. If register 220 is over-written before the delivery status is idle (0), then the status of that interrupt is undefined (may or may not have been accepted). |
| Level De-assert (14): | A bit used in conjunction with Trigger Mode (15) to simulate assertion/de-assertion of level sensitive interrupts (0-de-assert, 1-assert). For example, with Delivery Mode at Reset, Trigger Mode at Level and Level De-assert at 1, results in a de-assert of Reset to the processor of the addressed MPIC(s). This condition will also cause all MPICs to reset their Arbitration-ID (used for tie breaking in lowest priority arbitration) to the MPIC-ID. |
| Trigger Mode (15): | Same as for Redirection Table 109. |
| Remote Read Status (16:17) | Indicates status of data contained in the Remote Read register 224: 00 - Invalid - content of Remote Read register 224 invalid, remote MPIC unit unable to deliver. 01 - In Progress - Remote Read in progress, awaiting data. 10 - Valid - Remote Read complete, valid data. |
| Destination Shorthand (18:19): | A 3-bit field used to specify a destination without the need to provide the 32-bit destination field. This reduces software overhead by not requiring a second 32-bit write operation corresponding to bit field 32:63 for the follow common cases: a) software self interrupt, b) interrupt to a single fixed destination, c) interrupt to all processors that can be named in the Destination field (32:63), includig the sending processor. The 2-bit code is interpreted as follows: 00 - No shorthand, use Destination field (32:63). 01 - Self, current local-MPIC is the only destination (used for software interrupts). 10 - All including self. 11 - All excluding self, used during reset and debug. |
| Destination (32:63): | Operating system defined, same as for Redirection Table 109. Used only when Destination Shorthand is set to Dest Field (000). |

The I/O-MPIC unit 102 and all local MPIC units 104 receive messages via the MPIC-Bus 103. The MPIC unit's first check to see if it belongs to the destination in the message. For example, in the case of the 32-bit destination format previously cited, each MPIC unit with an ID value in MPIC-ID Register 222 less than 32 uses it MPIC-ID to index into the 32-bit destination array. If it finds its bit set, then the MPIC unit is addressed by this message. In the case of the 8×24 format, each MPIC unit checks if its MPIC-ID is equal to the MPIC-ID in the 32-bit destination field, or if it is a member of the group list, as shown in FIG. 7, by bit-wise ANDing its 24-bit group list register (32:55) with the group list in the message and ORing all resulting bits together. If the MPIC-ID in the message has a value of 255, then the MPIC unit is addressed by the message as well.

MPIC-bus send/receive and arbitration unit 216, FIG. 5, directs the destination and mode information on output 267 to acceptance logic unit 248 which performs the logic operations in conjunction with the contents of MPIC-ID Register 222. If the message is accepted, the vector information available on output 266 of unit 226, is decoded and together with the mode information is passed on through to the 3×256 bit vector array 230 by vector decode unit 228. The 8-bit interrupt Vector, when decoded by Vector Decode 228 determines which bit position out of 256 possible is set indicating the interrupt priority. When an interrupt is being serviced, all equal or lower priority interrupts are automatically masked by the prioritizer unit 240.

3×256 bit Vector Array 230 consists of 256 bit vectors used for storing interrupt related information. Each register is software read-only and hardware read/write. The registers are defined as follows:

| | |
|---|---|
| ISR, | In Service Register 231, shows interrupts that are currently in service for which no end of interrupt (EOI) has been sent by the processor; |
| IRR, | Interrupt Request Register 232, contains interrupts accepted by the local MPIC unit but not dispensed to the processor, |
| TMR, | Trigger Mode Register 234, indicates whether the interrupt is a level or edge sensitive type as transmitted by the sending MPIC-I/O units trigger mode bit in the redirection table entry. |

If an interrupt goes in service and the TMR bit is 0, indicating edge type, then the corresponding IRR bit is cleared and the corresponding ISR bit is set. If the TMR bit is 1, indicating level type, then the IRR bit is not cleared when the interrupt goes in service (ISR bit set). Instead, the IRR bit mirrors the state of the interrupt's input pin. As previously discussed, when the level triggered interrupt is de-asserted, the source I/O-MPIC detects the discrepancy and sends a message to the destination local-MPIC unit to clear its IRR bit.

FIG. 8 shows, by way of an example, how the remote IRR and the IRR bit at the destination local-MPIC unit track the state of the interrupt input (INTIN). It also illustrates how an EOI is followed immediately by the re-assertion of the interrupt as long as the INTIN is still asserted by some device. In this example, it is assumed that two devices, A and B, share a level triggered interrupt input to the I/O-MPIC. Device A raises a level interrupt as indicated on line (a), followed by a device B interrupt as shown on line (b). The resulting INTIN signal is the ORed combination of lines (a) and (b) as shown on line (c). The MPIC-bus send/receive unit 110 of FIG. 3 EXCLUSIVE-ORs (XORs) INTIN with the remote IRR bit, bit 14 of the Re-direction Table 104, shown on line (e) to yield the "level assert" and "level de-assert" shown on line (d). The local-MPIC IRR bit tracks the state of line (e) as shown on line (f). Line (g) demonstrates how an EOI is followed immediately by re-asserting the interrupt as long as the INTIN signal is still asserted by one of the devices.

FIG. 9 is a flow chart depicting the interrupt acceptance process of a local-MPIC unit. Upon receipt of a message, a local-MPIC unit is the current focus, i.e., the pertinent IRR or ISR bit is pending, it accepts the interrupt independent of priority and signals the other local-MPICs to abort the priority arbitration. This avoids multiple delivery of the same interrupt occurrence to different processors, consistent with prior art interrupt delivery semantics in uni-processor systems. If a local-MPIC unit is not, currently, the focus it listens for the acceptance by another local-MPIC. If more than one MPIC is available, arbitration, as described under the section entitled MPIC Bus Protocol, is invoked to determine the winner (lowest priority) unit.

If a message is sent as NMI, Debug or Reset them all units listed in the destination unconditionally assert/de-assert their processor NMI output pin 263, Debug pin 264, or Reset pin 265 of FIG. 5. ISR 231 and IRR 232 are by-passed and vector information is undefined.

The Task Priority Register (TPR) 242 of FIG. 5 stores the current priority of its processor's task which is dynamically subject to change because of explicit software actions, such as when tasks are switched, and upon entering or returning from an interrupt handler. TPR 242 is a 32-bit register supporting up to 256 priority levels by means of an 8-bit field (0:7). The four msb (4:7) correspond to the 16 interrupt priorities while the four lsb (0:3) provide additional resolution. For example, a TPR value with zero in the five msb and non-zero in the three lsb may be used to describe a task scheduling class between 0 (Idle) and 1 for the purpose of assigning an interrupt. This is particularly useful when a number of processors are operating at the same lowest level of priority.

A processor's priority is derived from the TPR 242, ISR 231 and IRR 232. It is the maximum of its task priority, and the priority of the highest order ISR bit, and the priority of the highest IRR bit, all evaluated using the four most significant bits of their coded 8-bit representation. This value, used in determining availability of a local-MPIC to accept an interrupt and in determining the lowest priority local-MPIC unit, is computed on the fly as required.

Once a local-MPIC accepts an interrupt, it guarantees delivery of the interrupt to its local processor. Dispensing of a maskable interrupt is controlled by the INT-/INTA protocol which begins with the local-MPIC unit asserting the INT pin 262 which is connected to the processor INT pin. If the processor has interrupts enabled, it will respond by issuing an INTA cycle on line 261 causing the local-MPIC to freeze its internal priority state and release the 8-bit Vector of the highest priority interrupt onto the processor data bus-106. The processor reads the Vector and uses it to find the interrupt handler's entry-point. The local-MPIC also sets the interrupt's ISR-bit. The corresponding IRR bit is cleared only if TMR 234 indicates an edge triggered interrupt as previously discussed.

If a level triggered interrupt is de-asserted just prior to its INTA cycle, all IRR bits may be clear and the Prioritizer 240 may not find a Vector to deliver to the processor on data bus 106. Instead, the Prioritizer 240 will return a Spurious Interrupt Vector (SIV) instead. The dispensing of the (SIV) does not affect ISR 231, so that the interrupt handler should return without issuing an EOI. The SIV is programmable via the SIV register within prioritizer 240.

It is possible that local MPIC units exist in the system that do not have a processor to which to dispense interrupts. The only danger this represents in the system is that if an interrupt is broadcast to all processors using lowest priority delivery mode when all processors are at the lowest priority, there is a chance that a local MPIC unit without the processor may accept the interrupt if this MPIC unit happens to have the lowest Arb ID at the time. To prevent this from happening, all local units initialize in the disabled state and must be explicitly enabled before they can start accepting MPIC messages from the MPIC-bus. A disabled local MPIC Unit only responds to messages with Delivery Mode set to "Reset". Reset/deassert messages should be sent in Physical Destination mode using the target's MPIC ID because the logical destination information in the local MPICs is undefined (all zeroes) when the local-MPIC comes out of Reset.

Before returning from an interrupt handler, software must issue an end-of-interrupt (EOI) command to its local-MPIC clearing the highest priority bit in ISR 231, by writing to EOI register 246, indicating the interrupt is no longer in service, and causing it to return to the next highest priority activity.

The MPIC system is initialized in the following manner:

a) Each MPIC unit has a reset input pin connected to a common reset line and activated by the system reset signal.
b) The 8-lsb of the data bus 106 are latched into MPIC-ID register 222;
c) Each local-MPIC asserts its processor Reset (RST) pin 265 and resets all internal MPIC registers to their initial state, i.e., Re-direction Table 109 and Local Vector Table 210 set so as to mask interrupt acceptance, otherwise setting register state to zero;
d) Each local-MPIC de-asserts it processor's reset pin to allow the processor to perform self-test and execute initialization code;
e) The first processor to get on MPIC-bus 103 will force other processors into reset by sending them the inter-processor interrupt with

| Delivery Mode = | Reset |
| Trigger Mode = | Level |
| Level De-Assert = | 0 |
| Destination Shorthand = | All Excl Self, | all other processors being kept in reset until the active processor's operating system allows them to become active;

f) The only running processor performs most of the system initialization and configuration, eventually booting an operating system which sends out a De-assert/Reset signal to activate the other processors.

D. MPIC-Bus Protocol

The MPIC-bus 103 is a 5-wire synchronous bus connecting I/O-MPIC and local-MPIC units. Four of these wires are for data transmission and arbitration while one is a clock line.

Electrically, the bus is wire-OR connected providing both bus-use arbitration, and lowest priority arbitration. Because of the wire-OR connection, the bus is run at a low enough speed such that design-specific termination tuning is not required. Also, the bus speed must allow sufficient time in a single bus cycle to latch the bus and perform some simple logic operations on the latched information in order to determine if the next drive cycle must be inhibited. With a 10 MHz bus speed, an interrupt requiring no arbitration would be delivered in about 2.3 $\mu$s, and with priority arbitration, about 3.4 $\mu$s.

The MPIC units 102 and 104 have separate MPIC-bus input and output pins which may be directly connected in a non-isolated configuration as shown in FIG. 11. Three-state input buffers 301 and output buffers 302 may be used to provide a hierarchical connection to MPIC-buses that are required to support a large number of processors as shown in FIG. 12.

Arbitration for use of the MPIC-bus 103 and for determining the lowest priority MPIC unit depends on all MPIC message units operating synchronously. Distributed bus arbitration is used to deal with the case when multiple agents start transmitting simultaneously. Bus arbitration uses a small number of arbitration cycles on the MPIC-bus. During these cycles, arbitration "losers" progressively drop off the bus until only one "winner" remains transmitting. Once the sending of a message (including bus arbitration) has started, any possible contender must suppress transmission until enough cycles have elapsed for the message to be fully sent. The number of bus cycles used depends on the type of message being sent.

A bus arbitration cycle starts with the agent driving its MPIC-ID on the MPIC-bus, higher order bits first. More specifically, the 8-bit MPIC-ID (I0:I7) is chopped into successive groups of 2 bits (I7:I6) (I5:I4) (I3:I2) (I1:I0). These tuples I(im):I(i), are then sequentially decoded to produce a four bit pattern (B0:B3) as shown in FIG. 13. Bits (B0:B3) are impressed on the four MPIC-bus lines, one bit per line. Because of the wired-OR connection to the MPIC-bus, each tuple of the ID only asserts to a single wire, making it possible for an agent to determine with certainty whether to drop-off ("lose") or to continue arbitrating the next cycle for the following two bits of the MPIC-ID, by simply checking whether the bus line agent that is driving the bus is also the highest order 1 on the bus. In this manner, each MPIC-Bus cycle arbitrates two bits.

Arbitration is also used to find the local MPIC unit with the lowest processor priority. Lowest-priority arbitration uses the value of the MPIC's Processor Priority Register appended with an 8-bit Arbitration ID (Arb ID) to break ties in case there are multiple MPICs executing at the lowest priority.

Using the constant 8-bit MPIC ID as the Arb ID has a tendency to skew symmetry since it would favor MPICs with low ID values. An MPIC's Arb ID is therefore not the MPIC ID itself but is derived from it. At reset, an MPIC's Arb ID is equal to its MPIC ID. Each time a message is broadcast over the MPIC-Bus, all MPICs increment their Arb ID by one, which gives them a different Arb ID value for the next arbitration. The Arb ID is then endian-reversed (LSB becomes MSB, etc.) to ensure more random selection of which MPIC gets to have the lowest Arb ID next time around. The reversed Arb ID is then decoded to generate arbitration signals on the MPIC bus as described above.

After bus arbitration the winner will drive its actual message on the bus, 4 bits per clock in nibble-serial fashion. MPIC messages come in two lengths: short at 21 cycles and long at 30 cycles. The interpretation of the first 19 cycles is the same for all message lengths. The long message type appends cycles for priority arbitration to the first 19 cycles. The medium message type only occurs if a complete arbitration is not needed as in case when the winner is known prior to arbitration.

The short message format is shown in FIG. 14 where the first column represents the message cycle index (1:19) while the next four columns represent the 4 data lines of the MPIC-bus.

The first four rows (1:4) represent the MPIC-bus arbitration cycles where any row has four entries representing the decoded tuple of the MPIC-ID as previously discussed, i.e., i76 . . . i76 represents tuple (7:6), i54 . . . i54, tuple (5:4), etc.

Cycle 5 is the extended delivery mode of the message and is interpreted in accordance with FIG. 15. The bit designated DM is the Destination Mode bit which is 0 for Physical Mode and 1 for Logical Mode. Bits M0, M1, M2 are previously assigned in the Redirection Table of FIG. 4.

Cycle 6 contains the control bits as defined in FIG. 16. The extended delivery mode and control bits, cycles 5 and 6, together determine the length of message needed and the interpretation of the remaining fields of the message as shown in FIG. 17.

Cycles 7 and 8 make-up the 8-bit interrupt vector.

Cycles 9 through 16 are the 32-bit destination field.

Cycle 17 is a checksum over the data in cycles 5 through 16. The checksum protects the data in these cycles against transmission errors. The sending MPIC unit provides this checksum.

Cycle 18 is a postamble cycle driven as 1111 by the sending MPIC allowing all MPICs to perform various internal computations based on the information contained in the received message. One of the computations takes the computed checksum of the data received in cycles 5 through 16 and compares it against the value in cycle 17. If any MPIC unit computes a different checksum than the one passed in cycle 17, then that MPIC will signal an error on the MPIC-bus in cycle 19 by driving it as 1111. If this happens, all MPIC units will assume the message was never sent and the sender must try sending the message again, which includes re-arbitrating for the MPIC-bus. In lowest priority delivery when the interrupt has a focus processor, the focus processor will signal this by driving 1110 during cycle 19. This tells all the other MPIC units that the interrupt has been accepted, the arbitration is preempted, and short message format is used. All (non focus) MPIC units will drive 1000 in cycle 19. Under lowest priority delivery mode, 1000 implies that the interrupt currently has no focus processor and that priority arbitration is required to complete the delivery. In that case, long message format is used. If cycle 19 is 1000 for non Lowest Priority mode, then the message has been accepted and is considered sent.

When an MPIC unit detects and reports an error during the error cycle, that MPIC unit will simply listen to the bus until it encounters two consecutive idle (0000) cycles. These two idle cycles indicate that the message has passed and a new message may be started by anyone. This allows an MPIC that got itself out of cycle on the MPIC-bus get back in sync with the other MPIC units.

Cycles 1 through 19 of the long message format are identical to cycles 1 through 19 of the short message format.

As mentioned, long message format is used in two cases:
(1) Lowest priority delivery when the interrupt does not have a focus. Cycles 20 through 27 are eight arbitration cycles where the destination MPIC units determine the one MPIC unit with lowest processor priority/Arb ID value.
(2) Remote Read messages. Cycles 20 through 27 are the 32 bit content of the remotely read register. This information is driven on the bus by the remote MPIC unit.

Cycle 28 is an Accept cycle. In lowest priority delivery, all MPIC units that did not win the arbitration (including those that did not participate in the arbitration) drive cycle 28 with 1100 (no accept), while the winning MPIC unit drives 1111. If cycle 28 reads 1111, then all MPIC units know that the interrupt has been accepted and the message is considered delivered. If cycle 28 reads 1100 (or anything but 1111 for that matter), then all MPIC units assume the message was unaccepted or an error occurred during arbitration. The message is considered undelivered, and the sending MPIC unit will try delivering the message again.

For Remote Read messages, cycle 28 is driven as 1100 by all MPICs except the responding remote MPIC unit, that drives the bus with 1111, if it was able to successfully supply the requested data in cycles 20 through 27. If cycle 28 reads 1111 the data in cycles 20 through 27 is considered valid; otherwise, the data is considered invalid. The source MPIC unit that issued the Remote Read uses cycle 28 to determine the state of the Remote Read Status field in the Interrupt Command Register (valid or invalid). In any case, a Remote Read request is always successful (although the data may be valid or invalid) in that a Remote Read is never retried. The reason for this is that Remote Read is a debug feature, and a "hung" remote MPIC that is unable to respond should not cause the debugging procedure to hang.

Cycles 29 and 30 are two idle cycles. The MPIC bus is available for sending the next message at cycle 31. The two idle cycles at the end of both short and long messages, together with non zero (i.e., non idle) encodings for certain other bus cycles allow an MPIC bus agent that happens to be out of phase by one cycle to sync back up in one message simply by waiting for two consecutive idle cycles after reporting its checksum error. This makes use of the fact that valid arbitration cycles are never 0000.

E. Timers

The Local Vector Table 210 of the local-MPIC unit 104 contains three independently operated 32-bit wide programmable timers 200, 201 and 202. Each timer can select its clock base from one of three clock inputs. Each time may operate in either a one-shot mode or a periodic mode and each can be configured to interrupt the local processor with an arbitrary programmable vector.

The local-MPIC unit 104 has two independent clock input pins: CLOCK pin provides the MPIC's internal clock, TMBASE provides for an external clock. The frequency of TMBASE is fixed by the MPIC architecture at 28.636 MHz. In addition, the local-MPIC contains a divider that can be configured to divide either clock signal by 2, 4, 8 or 16, as shown in FIG. 19. Base 0 is always equal to CLOCK; Base 1 always equals TMBASE; and Base 2 may either equal CLOCK or TMBASE divided by 2, 4, 8 or 16. Divider (Base 2) Configuration Register is shown in FIG. 20.

Software starts a timer by programming its 32-bit Initial Count Register. The timer copies this value into the Current Count Register and starts counting down at the rate of one count for each time base pulse (Base 0, 1 or 2). Each timer may operate One-shot or Periodic. If One-shot, the timer counts down once and remains at zero until reprogrammed. In Periodic Mode, the timer automatically reloads the contents of the Initial Count Register into the Current Count Register.

The three timers are configured by means of their Local Vector Table entries as shown in FIG. 21. The Vector field (0:7) is as previously described. The Mask i, bit (16) serves to mask (1) or not mask mask (0), the $i^{th}$ timer generated interrupt when count reaches 0. Base i field (18:19) is the base input used by the $i^{th}$ timer: 00-Base 0, 01-Base 1, and 10-Base 2. Mode i bit (17) indicates the mode of the $i^{th}$ timer: 0-one-shot, 1-periodic.

F. Processor Private Storage

Each local-MPIC unit provides Processor Private Storage 250, as shown in FIG. 5, with four 32-bit registers accessible only by the local processor. Since each processor addresses its registers in the same way (via the same address), the registers provides a convenient and processor architecture independent way of providing "processor-own" data. The contents of these registers is not interpreted by the MPIC in any way. These registers are located in the same physical address page as the other local MPIC registers, access to these registers may therefore be restricted to supervisor only. The operating system running on the processor is free to use these registers as it pleases.

We claim the following:

1. A multi-processor programmable controller system for operation in a multi-processor environment that includes a multiplicity of processors and at least one peripheral unit interconnected by a common multi-processor system bus, wherein the peripheral unit has an interrupt request line that may signal a request for servicing from at least one processor and, wherein any processor may request service from any other processor using an interrupt bus without the use of the common multi-processor system bus, comprising:
   a) an interrupt bus for communicating interrupt request and interrupt request status messages;
   b) an I/O controller connected to the interrupt request line of at least one associated peripheral and the interrupt bus, for accepting at least one peripheral interrupt signal, for formatting the interrupt signals for transmission on said interrupt bus, the formatted signal being representative of the nature and priority of the peripheral interrupt signal, and indicative of the group of processors eligible to service the interrupt, for transmitting the formatted interrupt signals and for receiving status information on the disposition of the interrupt request;
   c) a multiplicity of local processor controllers, each local processor controller associated with a specific processor, each local processor controller comprising means for accepting processor interrupt request signals from the associated processor, means for formatting the associated processor interrupt request signals, the formatted associated processor interrupt signals being indicative of the nature and priority of the associated processor interrupt, connected to said interrupt bus for receiving and accepting both I/O controller and other local processor controller formatted interrupt signals for which its associated processor is eligible to service, means for transmitting the associated processor formatted interrupt signals on said interrupt bus, means for broadcasting on said interrupt bus an acceptance signal upon acceptance of the received interrupt signals, means for queuing the accepted interrupt signals, and means for delivering accepted interrupts to the associated processor for servicing in priority order.

2. A system as in claim 1 further comprising:
a) means within said I/O controller for arbitrating with other I/O and local processor controllers over said interrupt bus for the control of said interrupt bus for the transmission of interrupt related signals; and
b) means within each said local processor controller for arbitrating priority with other I/O and local processor controllers over said interrupt bus for control of said interrupt bus for the transmission of interrupt related signals.

3. A system as in claim 2 further comprising a register in each of the local processor controllers for storing a unique pre-assigned identification number to each said controller, for establishing the relative priority of each local processor controller when arbitrating to establish the highest priority for bus use, and for establishing the lowest priority for the acceptance of interrupt request messages.

4. A system as in claim 1 wherein each said local processor controller further comprises:
a) a means for arbitrating the acceptance of interrupt signals based on the current priority of the local processor task so that, amongst the eligible processors, the local controller associated with the lowest priority processor accepts the interrupt request signal; and
b) means for selecting one of said local processors associated with the subset of eligible processors operating at the same lowest level priority so as to distribute the requests and servicing with uniform probability amongst the subset of eligible processors operating at the same lowest level priority.

5. A system as in either claim 3 or claim 4 in which standard message formats are used for all transmissions on said interrupt bus.

6. A system as in claim 5 in which a first of said standard formats for use with fixed destination interrupts further comprise:
a) an interrupt bus arbitration sequence;
b) a delivery mode portion indicating the basis of delivery, e.g., fixed or lowest priority;
c) a control portion indicating the destination and delivery mode, the type of interrupt (level or edge triggered) and whether to assert or deassert level type signal;
d) a destination portion indicating the eligible processors; and
e) a checksum value to ensure signal integrity.

7. A system as in claim 6 in which said message format is also used for system wide non-I/O interrupt functions such as reset and debug procedures.

8. A system as in claim 7 having an augmented second format for lowest priority destination interrupts further comprising a priority arbitration sequence for arbitrating between eligible candidate processors.

9. A system as in claim 8 wherein said priority arbitration sequence comprises:
a) a priority sequence based on the current priority of each processor; and
b) a unique randomized arbitration identifying sequence for determining the winning lowest priority destination.

10. A system as in claim 9 wherein each said local processor controller further comprises means for generating said priority arbitration identifying sequence.

11. A system as in claim 10 wherein said generating means operates on its controller identification number by incrementing the previous number and endian-reversing the resultant bit pattern to produce the new arbitration identifying sequence.

12. A system as in claim 7 wherein each said local processor controller further comprises:
a) means for said local processor controllers determining if it is a focus for the same interrupt for which service is being requested; and if so,
b) means for preempting the priority arbitration procedure.

13. A system as in claim 6 wherein each said local processor controller further comprises:
a) means for checking said checksum value and rejecting said message if in error;
b) means for appending an error indicator to said first standard format; and
c) means for causing all controllers including the sending controller to recognize that the transmitted message is rejected because of parity error.

14. A system as in claim 1 (once amended) wherein each said local processor controller further comprises means for arbitrating the acceptance of interrupt signals based on the current priority of the local processor task so that amongst the eligible processors, the local processor controller associated with the lowest priority accepts the interrupt request signal.

15. A multi-processor programmable interrupt controller system for operation in a multi-processor environment that includes at least one peripheral unit, wherein the peripheral unit has an interrupt request line that may signal a request for servicing from at least one processor and wherein any processor may request service from any other processor using an interrupt bus without the use of a common multi-processor system bus, each processor having a data/address bus, the multi-processor programmable controller system comprising:
a) an interrupt controller bus, distinct from the multi-processor system bus, for communicating interrupt request, interrupt request status, and interrupt controller bus arbitration messages;
b) an I/O interrupt controller comprising:
i) multiple interrupt signal input pins, each pin for connecting to a distinct interrupt request line for accepting I/O peripheral interrupt signals;
ii) a processor programmable re-direction table connected to said input pins comprising means for decoding I/O peripheral interrupt signals, means for prioritizing, means for destination addressing, and an output for outputting the decoded I/O peripheral interrupt signals; and
iii) interrupt controller bus send/receive means connected to said interrupt controller bus and to said re-direction table output, for transmitting and receiving interrupt controller bus messages and for arbitrating control of said interrupt controller bus; and c) each local processor interrupt controller connected to said interrupt controller bus and to the data/address bus of an associated local processor, comprising:

i) send/receive means for receiving and sending interrupt, interrupt status, and arbitration related messages on said interrupt controller bus;

ii) acceptance logic means for rejecting, accepting, and arbitrating received interrupt request messages including interrupt type and priority information;

iii) recording means coupled to said acceptance logic means and said send/receive means for recording the status of accepted interrupt request messages including type and priority;

iv) nesting storage means for priority ordering (nesting) of the accepted interrupt requests, connected to the local processor data/address bus, for storing and delivering the highest priority interrupt request when its associated local processor's priority is less than the highest priority queued interrupt request, and for sending a delivery attempt accepted acknowledgment from the processor to the sending source via said interrupt controller bus;

v) means for storing the processor controller identification number used for identifying each processor controller, coupled to the local processor data/address bus for processor assignment of the identification number, and coupled to said send/receive means and said acceptance logic means for use in arbitrating and accepting received interrupt request signals;

vi) means for tracking the associated local processor's current task priority and delivering same to said acceptance logic means; and vii) means coupled to the associated local processor and to said send/receive means for formatting an interrupt message specified by the associated local processor and for initiating transmission of the messages by said send/receive means.

16. A system as in claim 15 in which each said processor interrupt controller further comprises:

a) a timer means with selectable clock source for timing programmable intervals and generating an internal interrupt request at the end of said programmed interval;

b) means for sensing locally generated interrupts and generating an internal interrupt;

c) means for detecting processor bus parity errors and generating an internal interrupt; and d) a local interrupt vector table for formatting all said internal interrupts for prioritizing and addressing the interrupt message for transmission by said processor controller send and receiving means.

17. A system as in claim 15 in which each said processor interrupt controller further comprises means for storing and retrieving auxiliary data accessible only to its associated processor.

18. A system as in claim 15 in which said means for priority ordering generates a processor interrupt signal for advising its associated processor that an interrupt of higher priority than its present task is ready for acceptance by the processor.

* * * * *

UNITED STATES PATENT AND TRADEMARK OFFICE
CERTIFICATE OF CORRECTION

PATENT NO. : 5,283,904

DATED : February 1, 1994

INVENTOR(S) : Carson et al.

It is certified that error appears in the above-identified patent and that said Letters Patent is hereby corrected as shown below:

In column 13 at line 22 delete "them" and insert --then--

In column 20 at line 32 delete "(once amended)"

Signed and Sealed this

Second Day of September, 1997

Attest:

BRUCE LEHMAN

Attesting Officer

Commissioner of Patents and Trademarks